Figure 1:
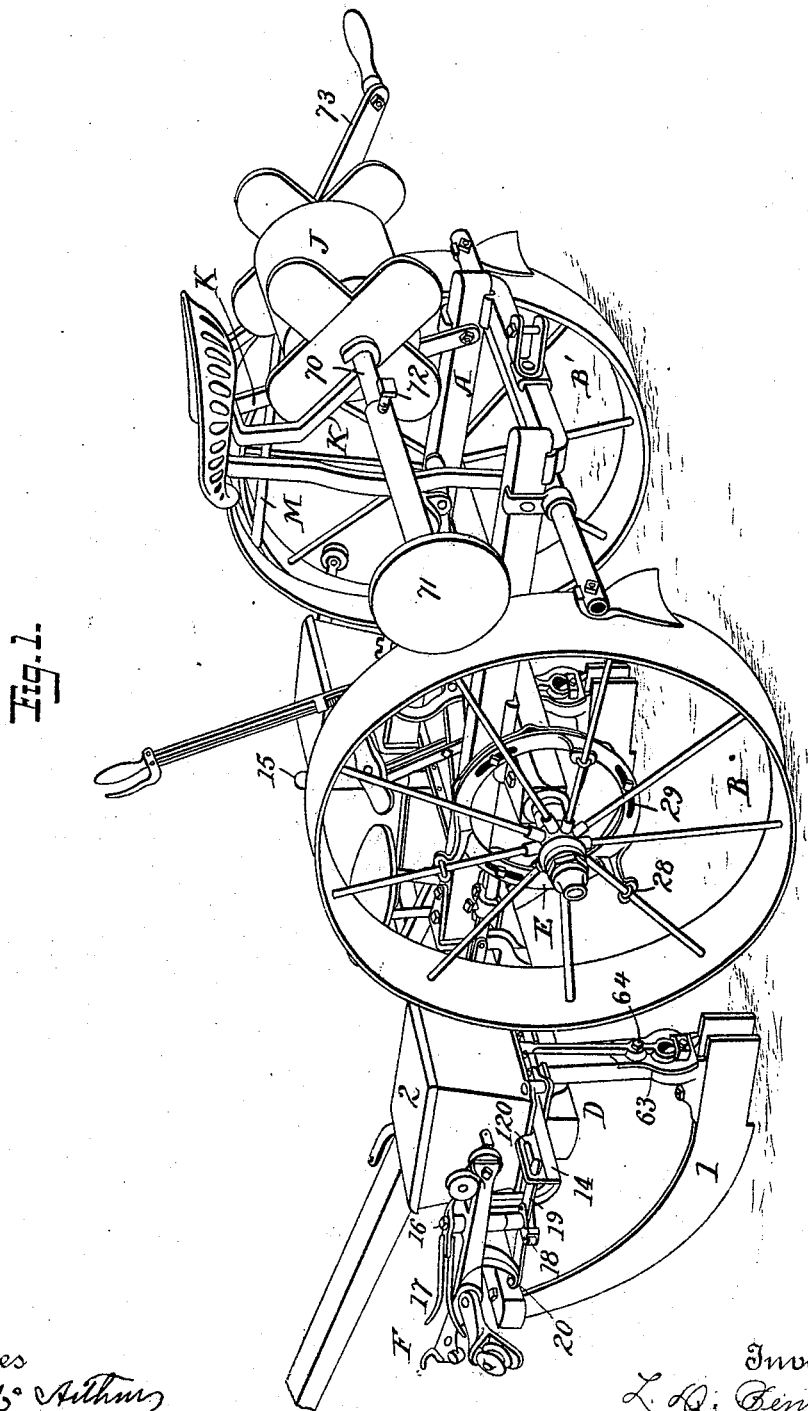

(No Model.)　　　　　　　　　　　4 Sheets—Sheet 1.
L. D. BENNER.
SEED PLANTER.

No. 519,692.　　　　　　　Patented May 15, 1894.

Witnesses
H. S. McArthur
J. J. McCarthy

Inventor
L. D. Benner.
By Foster & Freeman
Attorneys

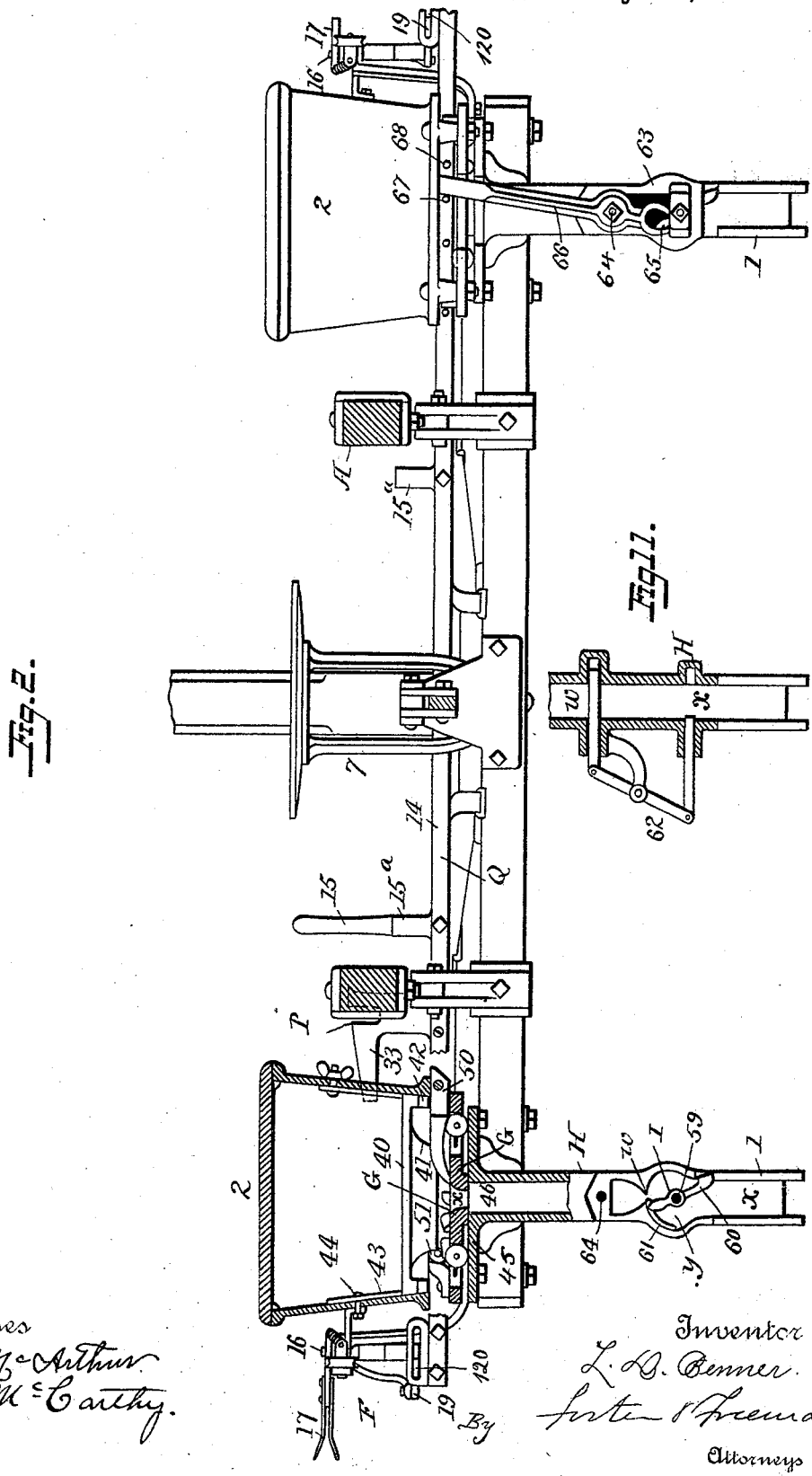

(No Model.) 4 Sheets—Sheet 3.
L. D. BENNER.
SEED PLANTER.
No. 519,692. Patented May 15, 1894.
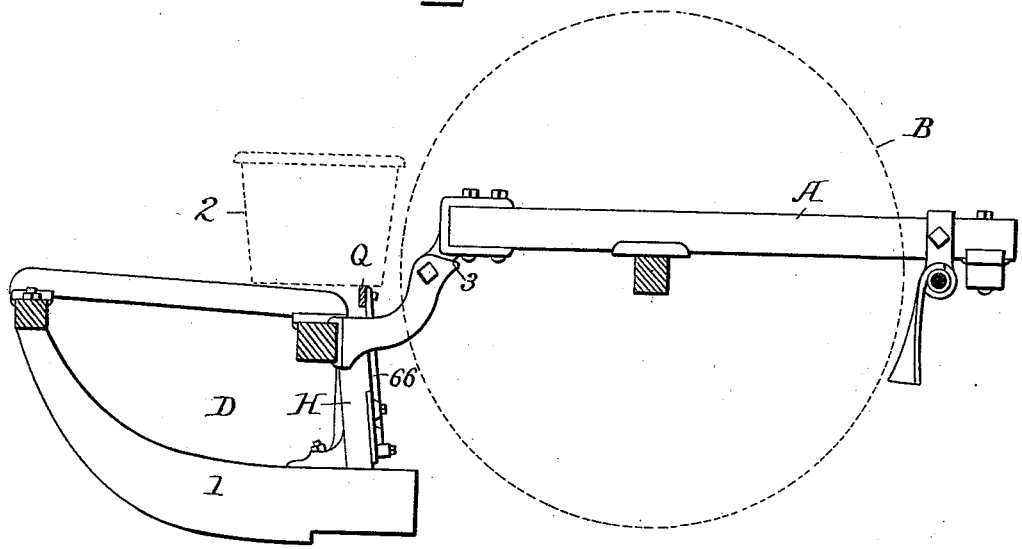
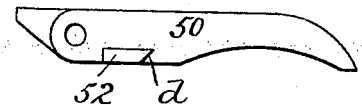
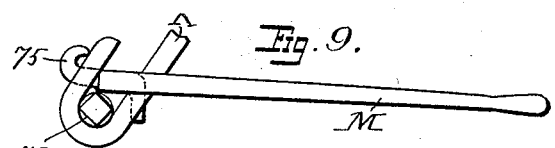
Witnesses
W. S. McArthur
J. J. McCarthy
Inventor
L. D. Benner.
By Foster & Freeman
Attorneys (No Model.) 4 Sheets—Sheet 4.
L. D. BENNER.
SEED PLANTER.
No. 519,692. Patented May 15, 1894.
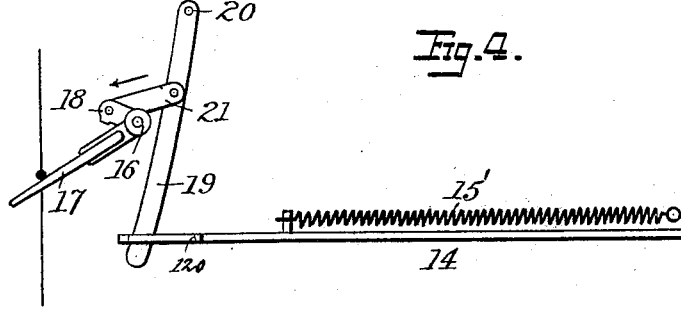
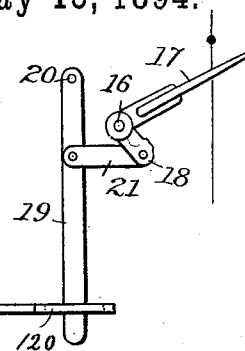
Fig. 4.
Fig. 5.
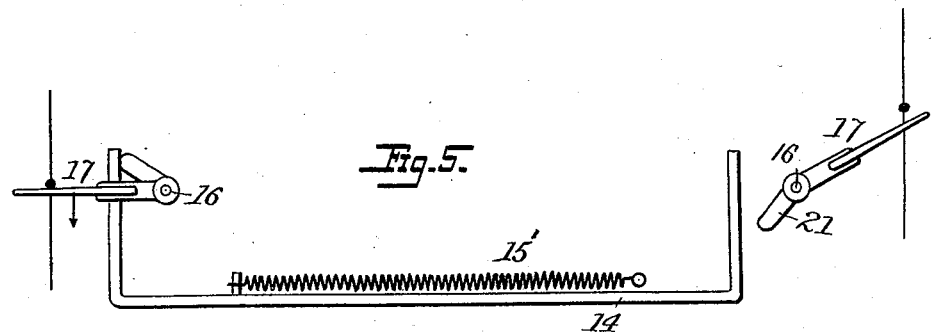
Fig. 6.
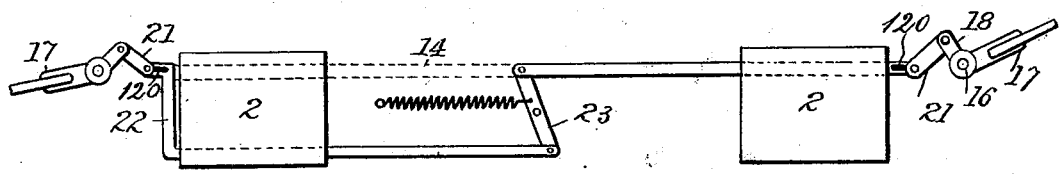
Fig. 7.
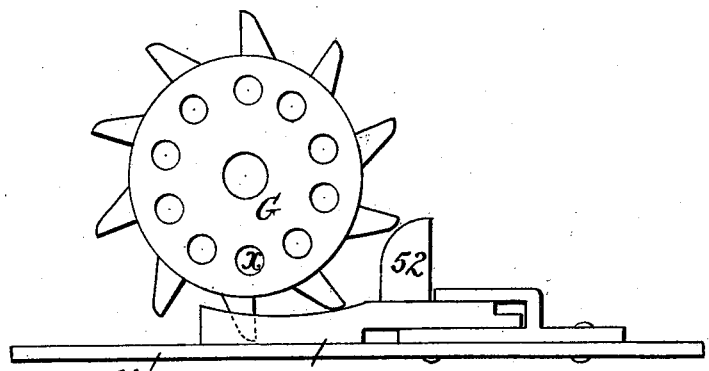
Witnesses
H. S. McArthur.
J. J. McCarthy.
Inventor
L. D. Benner.
By Foster & Freeman
Attorneys

UNITED STATES PATENT OFFICE.

LORENZO D. BENNER, OF PEORIA, ILLINOIS.

SEED-PLANTER.

SPECIFICATION forming part of Letters Patent No. 519,692, dated May 15, 1894.

Application filed November 2, 1891. Serial No. 410,646. (No model.)

*To all whom it may concern:*

Be it known that I, LORENZO D. BENNER, a citizen of the United States, residing at Peoria, in the county of Peoria and State of Illinois, have invented certain new and useful Improvements in Seed-Planters, of which the following is a specification.

My invention relates to that class of seed-planters adapted to be operated by means of projections upon cables or check row wires and my invention consists in certain improvements especially adapted to this class of planters but some of which can be employed in connection with planters of other kinds, which improvements are set forth hereinafter and illustrated in the accompanying drawings, in which—

Figure 1 is a perspective view of a seed planter embodying my improvements. Fig. 2 is an enlarged cross-sectional view through the seed-boxes; Fig. 3 a longitudinal section showing the frames; Figs. 4, 5 and 6 views illustrating the action of the check row devices. Fig. 7 and 8 are details of the seed carriers and operating devices. Figs. 9 and 10 illustrate the brake for the cable reel; Fig. 11 a section showing a modification of the seed valve.

A, is the main or rear wheel frame supported by side wheels B, B and D, is the front or runner frame having the furrow openings shoes 1, 1, and seed boxes 2, 2, as usual and pivoted to the rear frame. The shoes must be set well in advance of the wheels, otherwise when the front portion of the back frame is lifted the heels of the shoes are brought against the rims of the wheels. To prevent this I extend from the front frame one or more arms or projections 3, in such position that they will make contact with a part of the rear frame as the front of the latter is elevated and limit the extent to which the front frame can swing back to prevent any rearward movement sufficient to bring the shoes in contact with the wheel rims.

As shown in Fig. 2, the seed carriers or disks of both boxes 2, 2, are operated from a suitable slide 14, which may be moved by hand through the medium of a hand bar 15 adapted to either of two socketed pieces 15ª, extending upward from the slide, and also may be moved from the drill cam or cams E, operated from the wheels or carried by the same, or it may be moved from the check-row device F, of any suitable construction at either side of the machine. As shown in Figs. 4 and 5, the slide 14, is carried in one direction by a spring 15', and is moved in the opposite direction by the rocking of the shaft 16, connected with the tappet or lever 17, operated by the lugs upon the cable. At the lower end of the shaft 16, is a crank-arm 18, which is connected directly or indirectly with the slide 14. The preferable connection shown in Figs. 1 to 5, is through the medium of an arm 19, pivoted at 20, to the frame one arm adjacent to each box 2, and connected to a link 21, so that the arm is swung laterally as the shaft 16, is rocked. Any suitable connection may be made between the arm 19, and the slide 14. As shown, the arm 19, extends through a slot 120 in the end of the slide and the parts are so adjusted that when one arm 19, moves outward it shifts the slide against the action of the spring while the inward movement of the opposite arm shifts the slide in the same direction. In some cases the slide may be at the forward sides of the boxes 2, as shown in Fig. 6, in dotted lines, in connection with one box and full lines in connection with the other, in which case the link 21, is connected directly to the end of the slide. Or the link 21, may be connected to the end of an arm 22, extending forward from the slide, as shown at the left in Fig. 6. Or the slide may be in two sections connected to a lever 23, as shown in full lines Fig. 6, one link 21, connected to the arm 22, of one section and the other link connected directly to the end of the other section. In the construction shown in Fig. 5, the cranks bear in arms of the slide so that one pushes and the other pulls against the spring, and the action of one does not affect the position of the other.

In the construction illustrated in Figs. 1 to 5, the connection is made through the medium of a slot 120 so that when either check-row device moves the slide against the action of the spring the opposite slot will permit the movement of the opposite end of the slide without imparting motion to the check-row device at that end.

When the machine is used for drilling the slide derives its motion from a cam E, secured to and turning with one of the wheels B, through the means of any suitable connection, but as the drilling devices do not form a part of the invention claimed in this case, I will not describe in detail their construction or operation.

The slide may be connected to operate two feed carriers in any suitable manner and the latter may be sliding carriers or rotating carriers. As shown, there is a rotating carrier or disk G, in each box 2, having channels or pockets $x$, turning below a plate 40, having a central opening and depending flange 41, preventing the seed from spreading beyond the edge of the carrier, the said plate 40, resting on lugs 42, and being held in place by plates 43, bolted to the sides of the box 2, by bolts 44 passing through slots (not shown) in the plates 43, so that the latter can be lifted after the bolts are loosened to permit the plates 40, to be readily withdrawn. The seed carrier or feed disk G, turns upon a plate 45, having an opening 46, into which the seed is delivered from the pockets in the seed carrier. The intermittent motion of the carrier is secured by providing the slide 14, with a pawl 50, the end of which engages teeth upon the carrier, a pawl 51, preventing reverse motion. To prevent the carrier passing beyond its position from momentum, the slide or the pawl, preferably the latter, is provided with a finger 52, projecting laterally therefrom which as the slide completes its movement, comes in the way of one of the teeth and prevents further rotation of the carrier. To prevent injury in case the finger should be brought against the end of one of the teeth the lower face $d$, of the finger, on the side toward the carrier is beveled, so as in such case to ride over the end of the tooth merely lifting the pawl.

The chute H, extends downward from a plate bolted to the frame below the opening 46, and in said chute is pivoted a valve I, which may be of any suitable construction so as to alternately close two openings or ports $w$, $x$, at different heights in the channel in the chute. As shown, the said channel is contracted above the valve to form one port $w$, has a valve chamber $y$, below said port and a terminal port $x$, and the valve is upon a transverse spindle 59, and consists of a blade 60, having a lateral extension 61, at the top constituting a guard, the parts are so proportioned that when the guard is below the port $w$, the blade 60, will open the port $x$, but when the end of the blade closes said port, as shown in Fig. 2, the guard occupies a position at one side of the port $w$. By this arrangement the seed is arrested twice in its passage and drops three times in reaching the ground. Thus, it falls first from the pocket in the carrier onto the guard 61, then when the port $w$, is open it drops onto the blade 60, and is there arrested, and when the port $w$, is closed and the port $x$, is open it drops to the ground. It therefore will not be possible for the seed to pass directly to the ground in any instance.

It will be evident that the valve may be differently constructed to secure this triple movement of the seed. For instance the valve may consist of two separate blades, Fig. 11, connected to be moved in opposite directions by a cross-lever 62, and so proportioned that the lower blade will close the lower port before the upper port is opened.

When the machine is used for drilling, the seed passes directly through the chute H, and the valve I, is not used. In order to permit ready access to the interior of the chute and the valve therein, I provide the side of the chute with a detachable plate 63, secured by a bolt 64, and carrying the spindle of the valve and by removing said plate and withdrawing the valve and then replacing a plate a free channel is afforded. Upon a sleeve passing through the plate 63, and forming part of the valve is a finger 65, which extends between the forks of a lever 66, pivoted to the chute and extending upward between pins 67, 68, projecting from the slide so that the lever is oscillated to oscillate the valve by each movement of the slide.

By constructing the actuating devices so as to contact with the shake bar when moving in one direction only and employing a spring for effecting the return movement of the shake bar, I am enabled to dispense with all detaching contrivances, as each actuating device, until brought into action by the driver, whether it be the hand lever, the cam E, or the checkrow devices, will retain its place and be unaffected by the movements of the shake bar, and at the same time, each will be in position to be immediately brought into action.

The cable is carried upon a reel J, constructed in any suitable manner and having a shaft 70, which turns in hooked bearings of a bracket K, bolted to the frame that supports the seat or to the seat itself, the hooked arms of the bracket extending backward as shown, thereby permitting the lever to be readily put in place and withdrawn. To turn the reel automatically I provide one or both ends of the shaft 70, with a friction disk 71, adapted to bear upon the rim of one of the wheels B. To adjust the parts to machines of different sizes and also to facilitate storage, I make the shaft of the disk 71, hollow, to receive the end of the shaft 70, and provide it with a binding screw 72. The reel may be turned by hand by means of a suitable handle 73, applied to one end of the shaft. To prevent the reel from turning beyond the proper point by momentum, I provide a brake for bearing upon the reel or shaft. A simple form of brake consists of an arm M, having a hook 75, adapted to engage an opening in the end of one of the hooked arms of the bracket K, so that when the arm M, is pushed downward by the foot or hand it will bear upon the shaft 70, with a great leverage and retard its rotation to the desired extent. Any other form of brake operated by the driver may be used with like effect, that shown being an illustration of a preferred device.

Without limiting myself to the precise construction and arrangement of parts shown, I claim—

1. The combination with the seed boxes of an operating slide 14, a spring for carrying the same in one direction, check-row devices provided with tappets and crank shafts, and a connection between each crank shaft and one end of the slide said connections embodying a slot to permit the slide to move in one direction independently of the check-row device, substantially as set forth.

2. The combination of the slide having a slot 120, a check-row device having a tappet, and crank shaft, and a connection between the crank and a part moving in said slot, substantially as set forth.

3. The combination with the check row device having a crank shaft, an arm connected by a link with said crank shaft, and a slide having a slot into which said arm extends and a spring for moving the slide in one direction, substantially as set forth.

4. The combination of the revolving carrier and its teeth, the slide, the pawl 50, carried thereby, and the stop finger 52, projecting laterally from the pawl having its lower face on the side toward the carrier beveled as at $d$, whereby the finger is raised and rides over the tooth of the carrier provided it be brought against the end thereof, substantially as and for the purpose set forth.

5. The combination with the chute H, and its ports $w$ and $x$, of a valve having a plate 60, and guard 61, substantially as described.

6. The combination of the reel and its shaft, and disk 71, connected adjustably and removably with the reel shaft, substantially as described.

7. In a corn planter the combination of a reel mounted in rear of the driver's seat, the supports in which its shaft is mounted, the lever M, having a hooked end engaging with one of the supports of the reel and bearing upon the reel shaft and extending forward into position to be operated by the driver while upon his seat, substantially as described.

In testimony whereof I have signed my name to this specification in the presence of two subscribing witnesses.

LORENZO D. BENNER.

Witnesses:
   CHARLES E. FOSTER,
   W. S. MCARTHUR.